(12) United States Patent
Nakajima et al.

(10) Patent No.: US 12,330,503 B2
(45) Date of Patent: Jun. 17, 2025

(54) POWER SUPPLY CONTROL METHOD AND POWER SUPPLY CONTROL DEVICE

(71) Applicant: Nissan Motor Co., Ltd., Yokohama (JP)

(72) Inventors: Shinji Nakajima, Kanagawa (JP); Toshiyuki Koide, Kanagawa (JP); Kenichi Gotou, Kanagawa (JP); Hirotaka Koyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 404 days.

(21) Appl. No.: 17/920,671

(22) PCT Filed: Apr. 27, 2020

(86) PCT No.: PCT/JP2020/017955
§ 371 (c)(1),
(2) Date: Oct. 21, 2022

(87) PCT Pub. No.: WO2021/220340
PCT Pub. Date: Nov. 4, 2021

(65) Prior Publication Data
US 2023/0150366 A1    May 18, 2023

(51) Int. Cl.
*B60L 1/02* (2006.01)
*B60L 50/60* (2019.01)
(52) U.S. Cl.
CPC ............... *B60L 1/02* (2013.01); *B60L 50/60* (2019.02); *B60L 2210/10* (2013.01)

(58) Field of Classification Search
CPC .... B60L 1/00; B60L 1/02; B60L 50/60; B60L 2210/10; B60L 58/20; B60L 3/0092; Y02T 10/70
See application file for complete search history.

(56) References Cited

U.S. PATENT DOCUMENTS

2015/0210165 A1    7/2015 Lachmund et al.
2017/0368941 A1*  12/2017 Chow ................... H02M 7/44
2018/0162230 A1    6/2018 Kamachi et al.

FOREIGN PATENT DOCUMENTS

CN    109249811 A    1/2019
JP    2005- 51885 A    2/2005
(Continued)

OTHER PUBLICATIONS

English translation of PCT/JP2020/017955 Written Opinion of the International Searching Authority. Retrieved from WO2021220340 having recorded date of Oct. 27, 2022. Weblink is https://patentscope.wipo.int/search/en/detail.jsf?docId=WO2021220340 (Year: 2022).*

*Primary Examiner* — Calvin Cheung
(74) *Attorney, Agent, or Firm* — Young Basile Hanlon & MacFarlane, P.C.

(57) ABSTRACT

A power supply control device includes a high-power battery, a low-power battery, a relay that electrically connects the high-power battery and the low-power battery, a power supply switch, and a controller that controls an on/off state of the relay. When a power supply state is a state in which power is supplied from the high-power battery to the low-power battery with the relay therebetween, if the controller receives a first signal, the controller switches the relay from an on state to an off state, and then inhibits the relay from switching from the off state to the on state.

7 Claims, 8 Drawing Sheets

(56) References Cited

FOREIGN PATENT DOCUMENTS

| JP | 2005261041 A | * | 9/2005 | ............. Y02T 10/62 |
|----|--------------|---|--------|--------------------------|
| JP | 2015-107022 A | | 6/2015 | |
| JP | 2018- 83486 A | | 5/2018 | |
| JP | 2018-98844 A | | 6/2018 | |

* cited by examiner

FIG. 3

| | ON/OFF OF RELAY ||
| | NORMAL | LONG PRESS OF POWER SUPPLY SWITCH (2 SECONDS OR LONGER) |
|---|---|---|
| POWER OFF (FIRST STATE) | OFF | OFF |
| SECOND STATE | ON ⇒ | OFF |
| THIRD STATE | ON ⇒ | OFF |
| FOURTH STATE | ON | ON |

FIG. 4

| POWER SUPPLY POSITION | DOOR LOCK | COMMUNI-CATION DEVICE | SECURITY DEVICE DARK CURRENT | NAVIGATION DEVICE AUDIO DEVICE | METER | BLOWER MOTOR | POWER WINDOW | DCDC CONVERTER | HEATER | COMPRESSOR | INVERTER |
|---|---|---|---|---|---|---|---|---|---|---|---|
| POWER OFF (FIRST STATE) | ENERGIZATION | ENERGIZATION | ENERGIZATION | | | | | | | | |
| SECOND STATE (TIME LIMIT PRESENT) | ENERGIZATION | ENERGIZATION | ENERGIZATION | ENERGIZATION | | | | | | | |
| THIRD STATE (TIME LIMIT ABSENT) | ENERGIZATION | ENERGIZATION | ENERGIZATION | ENERGIZATION | ENERGIZATION | ENERGIZATION | ENERGIZATION | ENERGIZATION | | | |
| FOURTH STATE | ENERGIZATION | ENERGIZATION | ENERGIZATION | ENERGIZATION | ENERGIZATION | ENERGIZATION | ENERGIZATION | ENERGIZATION | ENERGIZATION | ENERGIZATION | ENERGIZATION |
| FIFTH STATE (LONG PRESS OF POWER SUPPLY SWITCH) | ENERGIZATION | ENERGIZATION | ENERGIZATION | ENERGIZATION | ENERGIZATION | ENERGIZATION | ENERGIZATION | ENERGIZATION | | | |

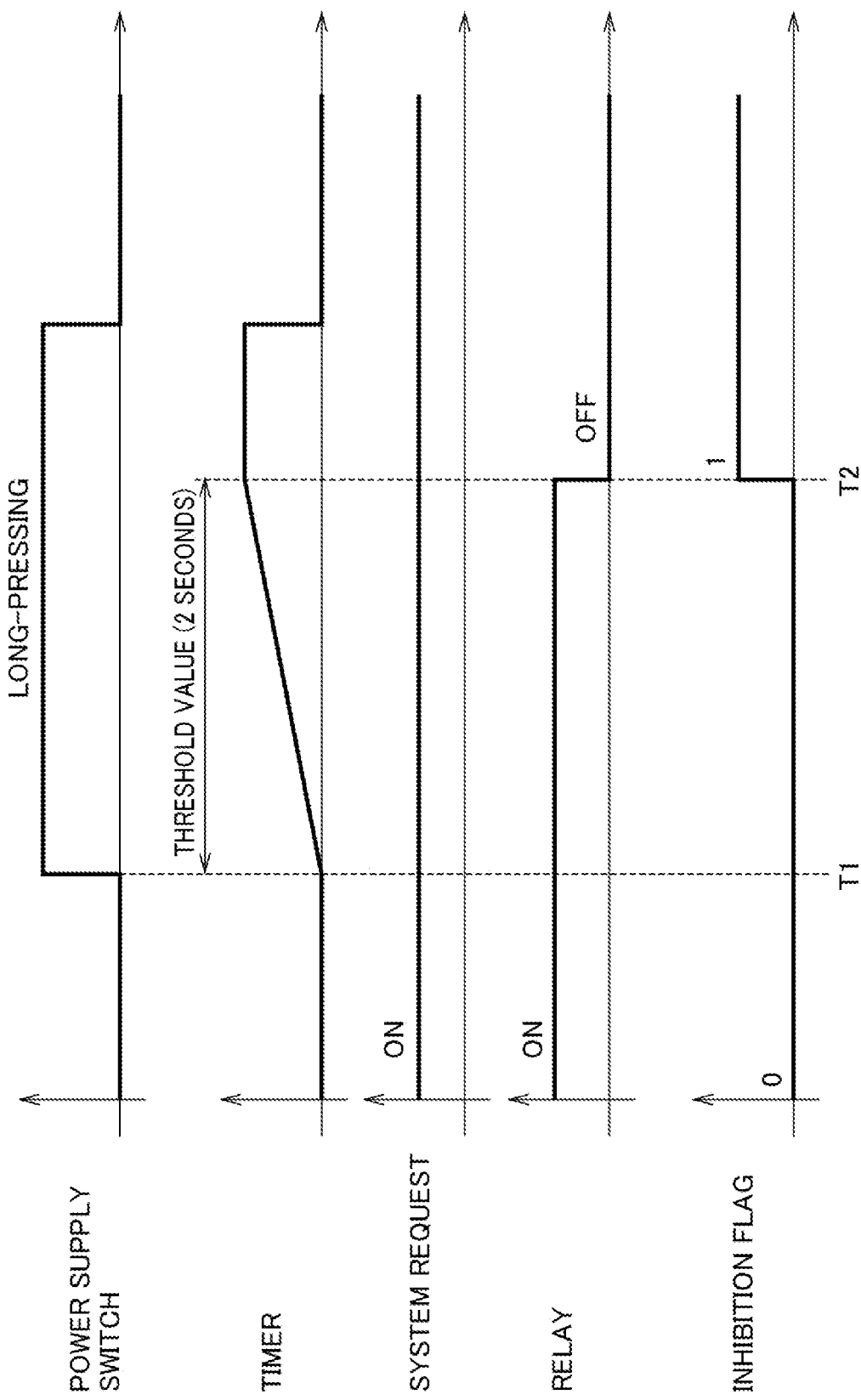

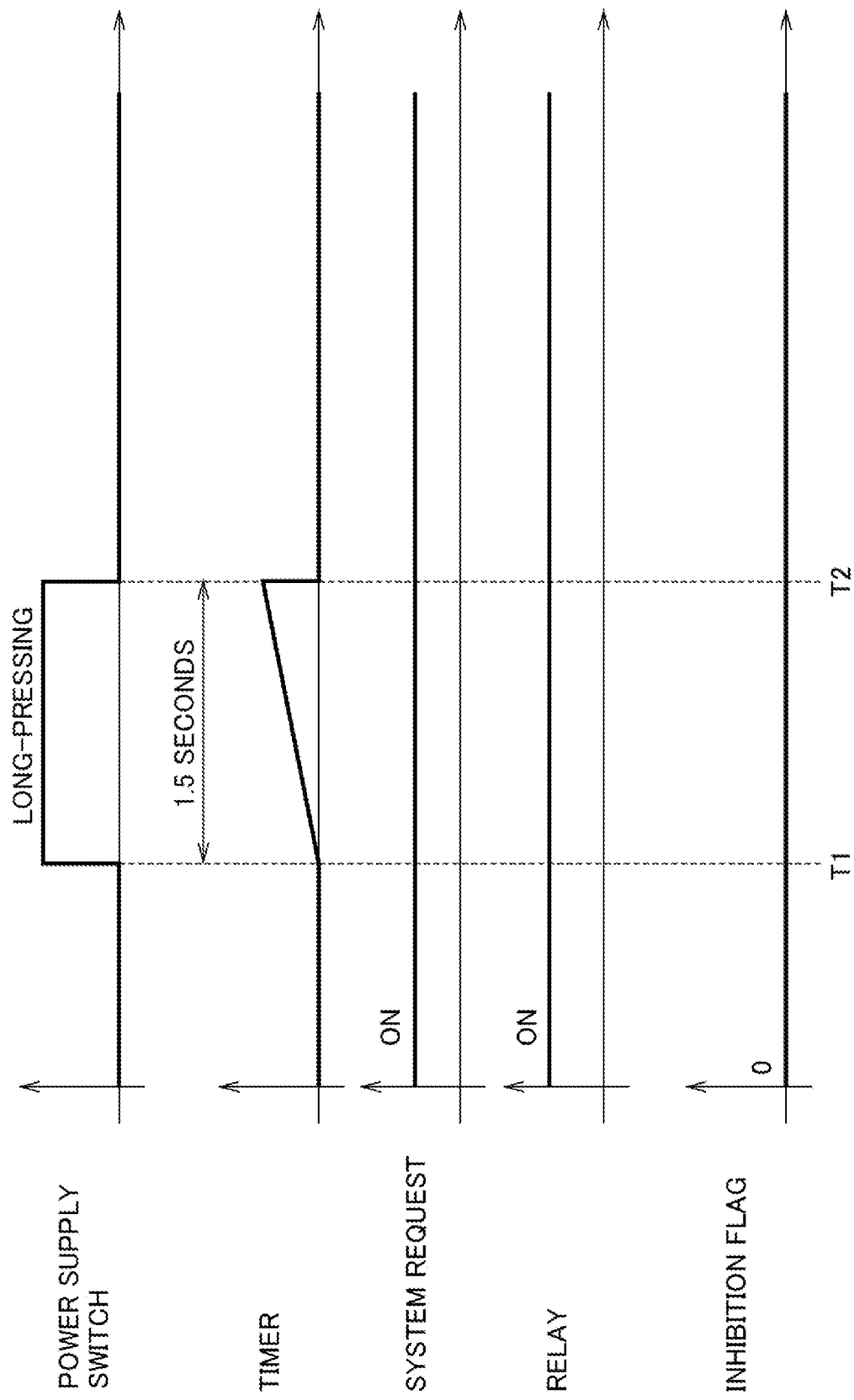

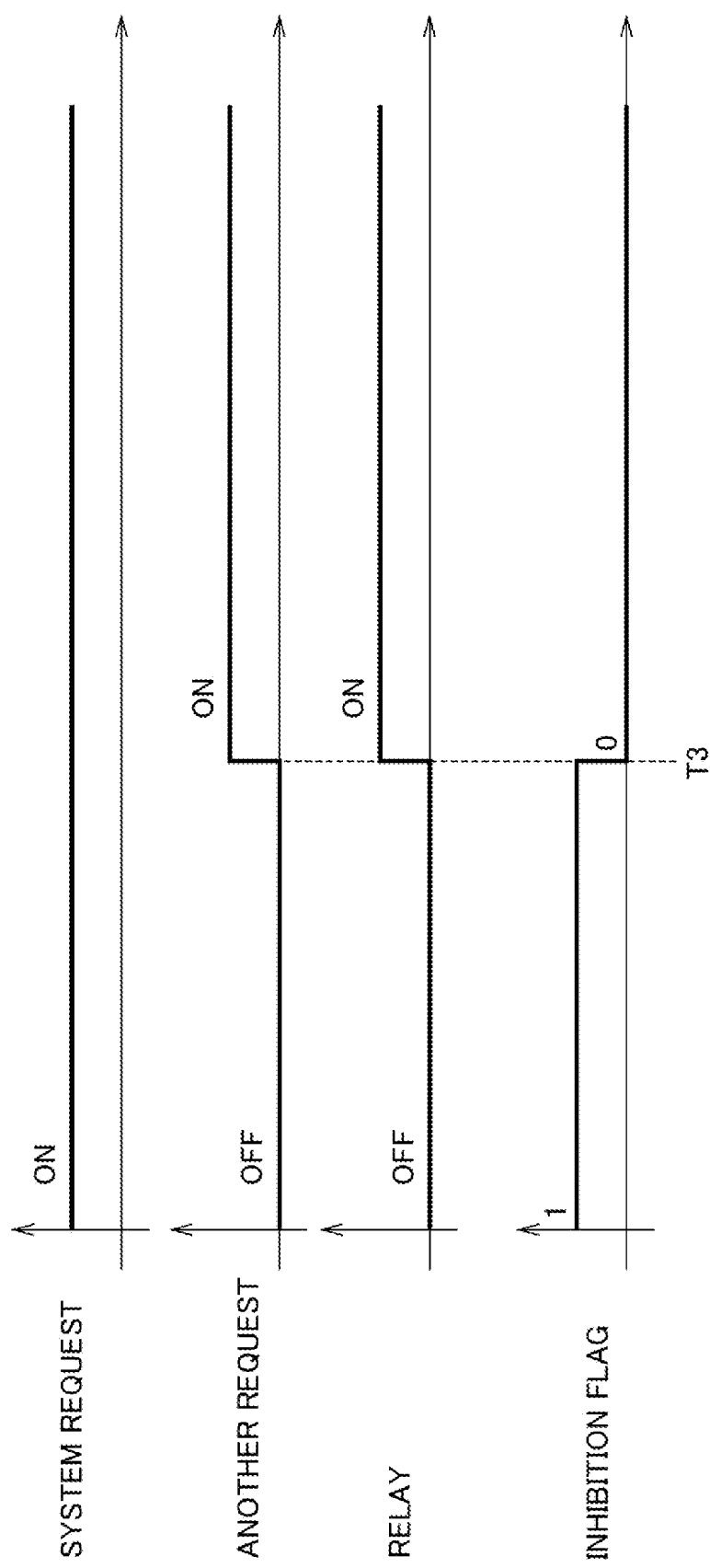

POWER SUPPLY CONTROL METHOD AND POWER SUPPLY CONTROL DEVICE

TECHNICAL FIELD

The present invention relates to a power supply control method and a power supply control device.

BACKGROUND

An invention for controlling a power supply mode of an electric vehicle is conventionally known (Japanese Unexamined Patent Application Publication No. 2018-98844). In the invention disclosed in Japanese Unexamined Patent Application Publication No. 2018-98844, when an electrical component mounted in the electric vehicle is in operation, the power supply mode is kept on even after charging to a driving battery is stopped.

SUMMARY

There is a method for changing a state in which a high-power battery and a low-power battery are not connected to a state in which the high-power battery and the low-power battery are connected (what is referred to as a high-power state) by using an event (for example, signal reception) other than a switch operation as a trigger. According to such a method, the state can be changed to the high-power state relatively easily.

However, if such a method is adopted, it is assumed that even if the high-power state is released, the state easily changes to the high-power state again. Therefore, it is necessary to prevent the state from changing to the high-power state again after the high-power state is released. However, the invention disclosed in Japanese Unexamined Patent Application Publication No. 2018-98844 does not disclose anything in relation to this point.

The present invention has been devised in view of the above described problems, and an object of the present invention is to provide a power supply control method and a power supply control device capable of preventing a state from changing to a high-power state again after the high-power state is released.

A power supply control method according to one aspect of the present invention includes: when a power supply state is a state in which power is supplied from a high-power battery to a low-power battery with the relay therebetween, if the controller receives a first signal, switching the relay from an on state to an off state and then inhibiting the relay from switching from the off state to the on state by means of the controller.

According to the present invention, it is possible to prevent a state from changing to a high-power state again after the high-power state is released.

BRIEF DESCRIPTION OF THE DRAWINGS

FIG. 3 is a diagram for explaining an on/off state of a relay 13 according to an embodiment of the present invention;

FIG. 4 is a diagram for explaining energization states in an electric vehicle in each power supply position state;

FIG. 5 is a timing chart for explaining an operation example of a power supply control device 100 according to an embodiment of the present invention;

FIG. 6 is a timing chart for explaining another operation example of a power supply control device 100 according to an embodiment of the present invention;

FIG. 7 is a timing chart for explaining another operation example of a power supply control device 100 according to an embodiment of the present invention.

DETAILED DESCRIPTION

Figure 1:
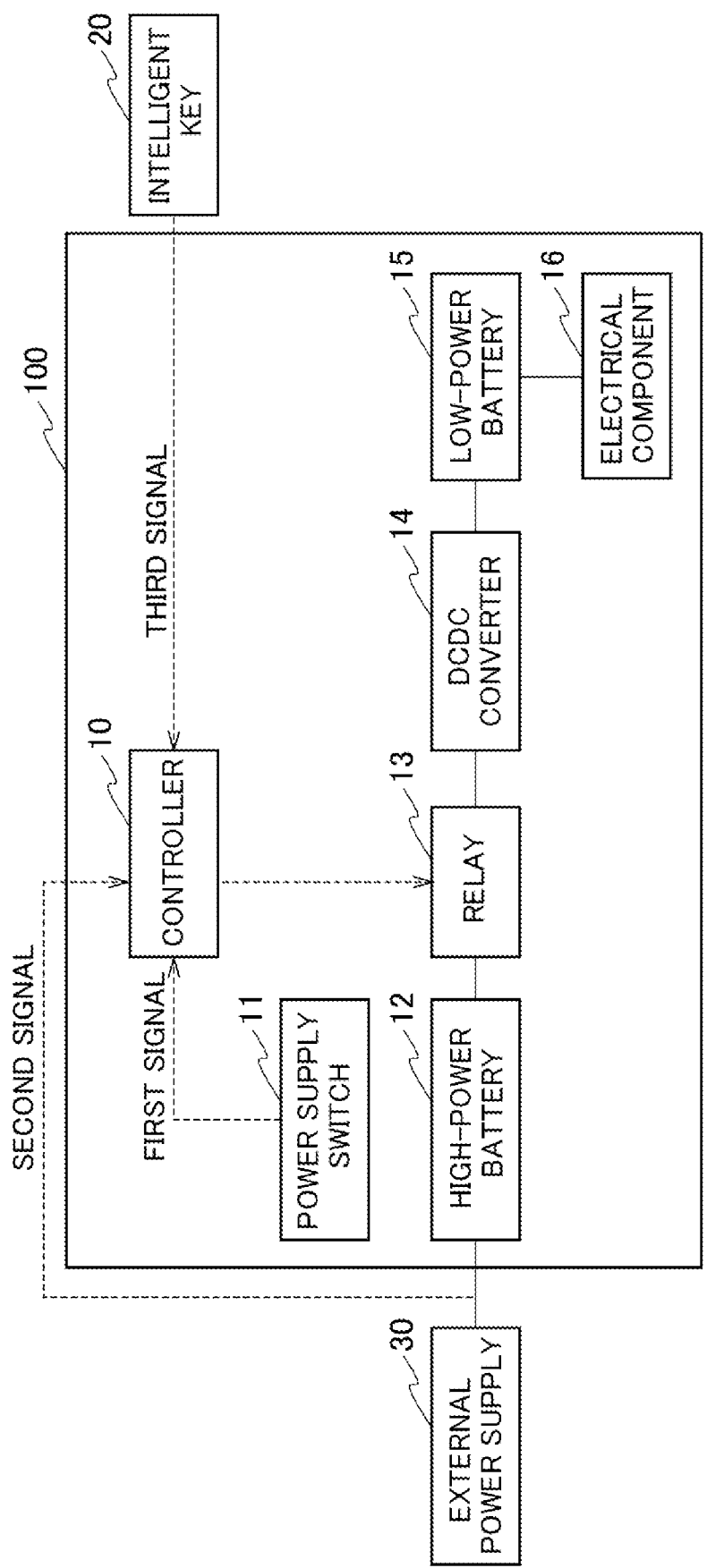
FIG. 1 is a block diagram of a power supply control device 100 according to an embodiment of the present invention.

An embodiment of the present invention will be described below with reference to the drawings. In the drawings, the same parts are denoted by the same reference numerals and the description thereof is omitted.

With reference to FIG. 1, a configuration example of a power supply control device 100 mounted in a vehicle will be described. The power supply control device 100 includes a controller 10, a power supply switch 11, a high-power battery 12, a relay 13, a DCDC converter 14, a low-power battery 15, and electrical components 16 as shown in FIG. 1. A vehicle in the present embodiment refers to an electric vehicle which uses electricity as an energy source.

The controller 10 is an electronic control unit (ECU) having a central processing unit (CPU), a read only memory (ROM), a random access memory (RAM), a controller area network (CAN) communication circuit, and the like. The controller 10 controls each function of the electric vehicle. As an example, the controller 10 controls the on/off state of the relay 13 based on received signals (a first signal to a third signal).

The power supply switch 11 is a pressing-type switch installed in a vehicle. Although the installation position of the power supply switch 11 is not particularly limited, the power supply switch 11 is usually installed at a position where a user sitting on the driver's seat can easily operate the power supply switch 11. As an example, the power supply switch 11 is positioned near the steering wheel. Each time the user presses the power supply switch 11, the state of the power supply is switched. This kind of power supply state is referred to as a "power supply position" in the present embodiment. Details of the power supply position will be described later. The power supply switch 11 has an on/off indicator.

The high-power battery 12 is a driving battery used mainly as a power supply of a motor (not shown). The high-power battery 12 is a large-capacity secondary battery composed of a plurality of battery modules. An external power supply 30 is used for charging the high-power battery 12. The user charges the high-power battery 12 by connecting the external power supply 30 and the electric vehicle by using a dedicated charging cable.

The low-power battery 15 is used as a power supply of the electrical components 16 mounted in a vehicle. As an example, the low-power battery 15 is a lead-acid battery that stores power at a voltage in the range from 12 V to 15 V. Examples of the electrical components 16 to which the low-power battery 15 supplies power include a navigation device, an audio device, and the like.

The relay 13 and the DCDC converter 14 are connected between the high-power battery 12 and the low-power battery 15. The low-power battery 15 is electrically connected to the high-power battery 12 by means of the relay 13. The on/off state of the relay 13 is controlled by means of the controller 10. If the power supply switch 11 is not turned off, the relay 13 is usually turned on. The DCDC converter 14 drops the power of the high-power battery 12 and supplies the power to the low-power battery 15. Although FIG. 1 shows the electrical components 16 and the DCDC converter 14 separately, the DCDC converter 14 is also a type of the electrical components 16.

An intelligent key 20 is used for remotely controlling unlocking and locking of the door. If a user presses an unlocking switch of the intelligent key 20, all doors of the electric vehicle are unlocked. However, the function of the intelligent key 20 is not limited to this. The door is unlocked even if the user presses a switch attached to a door handle or a trunk. Briefly explaining the system, both of the electric vehicle and the intelligent key 20 have an antenna for transmitting radio waves and a receiver for receiving radio waves. If the user presses a switch attached to the door handle or the trunk, a radio wave is transmitted from the antenna of the electric vehicle. The intelligent key 20 that has received the radio wave automatically returns the radio wave. When the receiver of the electric vehicle receives this radio wave, the door is unlocked. The intelligent key 20 may be referred to as a smart key.

The first signal shown in FIG. 1 is transmitted from the power supply switch 11 to the controller 10. The second signal is transmitted to the controller 10 if the external power supply 30 and the electric vehicle are connected by using a dedicated charging cable. The third signal is transmitted from the intelligent key 20 to the controller 10. After receiving the first to third signals, the controller 10 controls the on/off state of the relay 13 in accordance with the received signals.

Next, the power supply position will be described with reference to FIG. 2.

Figure 2:
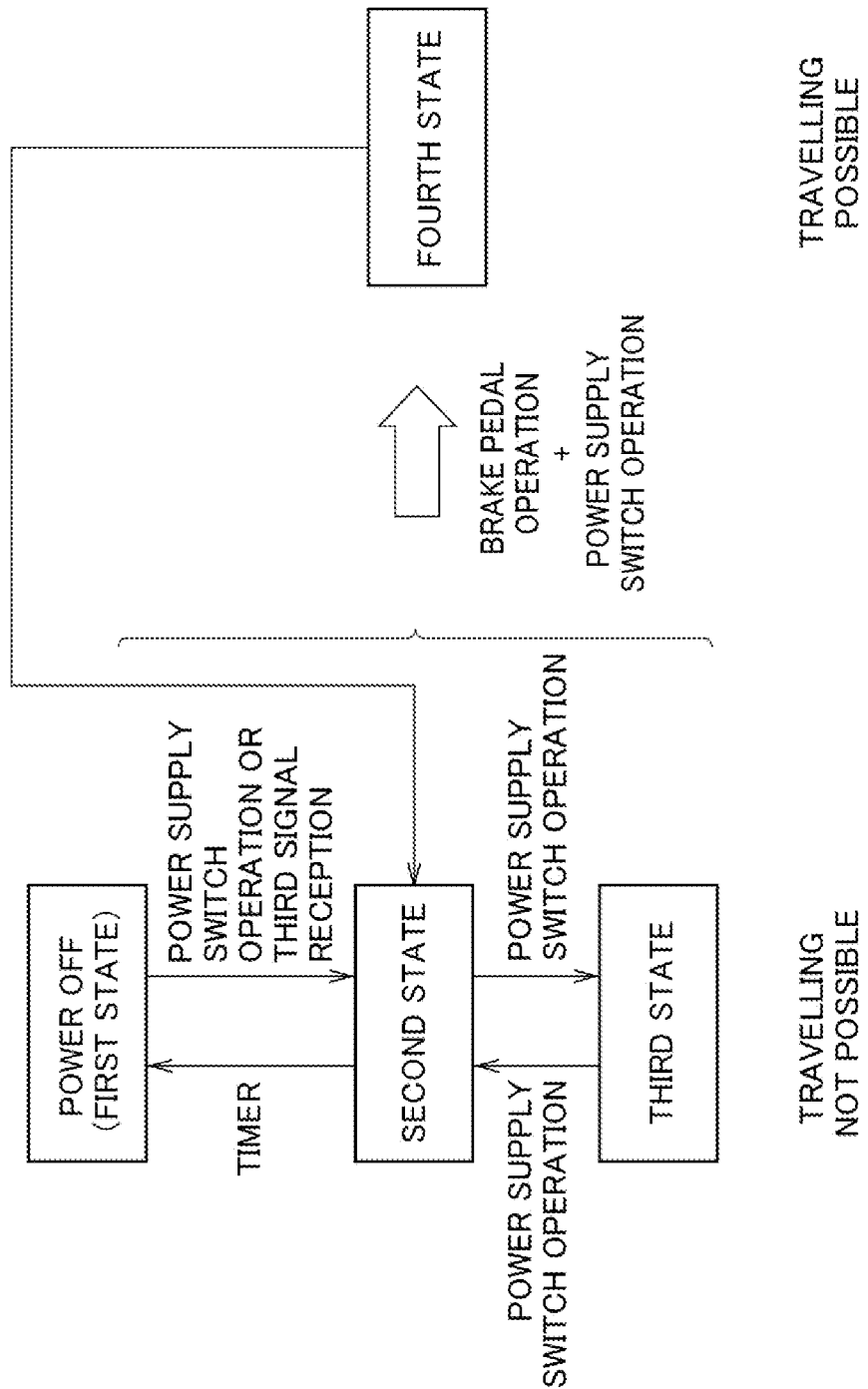
FIG. 2 is a diagram for explaining a power supply position according to an embodiment of the present invention.

In the present embodiment, as shown in FIG. 2, the power supply position includes four states of power off (a first state), a second state, a third state, and a fourth state. Although the power supply position additionally includes a fifth state, the first to fourth states will be described here, and the fifth state will be described later.

Power off means a state in which the power supply switch 11 is turned off. When the power supply position is power off, all devices other than some devices do not operate. Some functions are door locks (including unlocks), communication devices, and security devices. In addition, even if the power supply position is power off, a minute current (what is referred to as a dark current) flows through the electrical components 16 to back up the functions. This dark current is supplied from the low-power battery 15. When the power supply position is power off, the indicator of the power supply switch 11 is turned off.

The second state is a state in which the power supply switch 11 is turned on and the indicator of the power supply switch 11 is turned on. When the power supply position is in the second state, the relay 13 is turned on, and power is supplied from the high-power battery 12 to the low-power battery 15 with the relay 13 therebetween. More specifically, by the relay 13 being turned on when the power supply position is in the second state, power is supplied from the high-power battery 12 to the low-power battery 15 with the DCDC converter 14 therebetween. In the second state, the user can use many electrical components 16 except for some electrical components. Specifically, in the second state, the user can set a route by operating the navigation device and listen to the radio by operating the audio device.

In the second state, a meter and a blower motor do not operate. This is because, if a predetermined time (for example, about 1 to 10 minutes) elapses during which no operation is performed by the user in the second state, the power supply position automatically changes from the second state to power off. The blower motor is used to send air from an air conditioner into the vehicle interior, and a fan is attached to the blower motor. In this arrangement, if a predetermined time elapses during which no operation is performed by the user, the blower motor stops and the air blowing stops, that is, the air conditioner is turned off. If the air conditioner is automatically turned off, the user may feel dissatisfied. Therefore, the blower motor does not operate in the second state. The meter is an electrical component for providing various pieces of information to the user. Therefore, the user may feel an inconvenience if the meter is automatically turned off. Therefore, the meter does not operate in the second state. The absence of user operation means the absence of an input from the user to the electrical components 16. The second state may be referred to as AUTOACC.

In the third state, as in the second state, the power supply switch 11 is turned on and the indicator of the power supply switch 11 is turned on. When the power supply position is in the third state, as in the second state, the relay 13 is turned on and power is supplied from the high-power battery 12 to the low-power battery 15 with the relay 13 therebetween. The third state differs from the second state in that, while in the second state, the meter and the blower motor do not operate, in the third state, all electrical components including the meter and the blower motor operate. The third state may be referred to as IGN-ON.

Next, the change of the power supply position will be described. As shown in FIG. 2, each time the user presses the power supply switch 11, the power supply position changes to power off (the first state), the second state, and the third state in this order. Suppose that the user presses the power supply switch 11 when the power supply position is in the third state. In the above case, the power supply position changes to the second state. Suppose that a predetermined time elapses during which no operation is performed by the user as described above when the power supply position is in the second state. In the above case, the power supply position automatically changes to power off. Here, means for changing power off to the second state is not limited to the operation of the power supply switch 11. Even when the user presses the unlocking switch of the intelligent key 20, the power supply position changes from power off to the second state. More specifically, suppose that the user presses the unlocking switch of the intelligent key 20 possessed by the user before the user gets on the electric vehicle. In the above case, the third signal is transmitted from the intelligent key 20 to the controller 10 (see FIG. 1). The controller 10 that has received the third signal changes the power supply position from power off to the second state. This enables the user to use the navigation device, the audio device, and the like immediately after getting on the vehicle. Meanwhile, in the second state of the present embodiment, the time required for supplying power from the low-power battery 15 to the electrical components 16 becomes long, and state of charge (SOC) of the battery may decrease. Therefore, as described above, in the second state, the controller 10 turns on the relay 13 and causes power to be suppled from the high-power battery 12 to the low-power battery 15 with the relay 13 therebetween. This prevents reduction in the SOC of the low-power battery 15 even if the time required for supplying power from the low-power battery 15 to the electrical components 16 is increased.

In this way, supplying power from the high-power battery 12 to the low-power battery 15 with the relay 13 therebetween in the second state (also in the third state) of the present embodiment can be rephrased as a requirement from the power system side. The requirement from the power system side will be simply referred to as a "system request" below.

As shown in FIG. 2, when the power supply position is power off, in the second state, or in the third state, travelling of the electric vehicle is not possible. To enable travelling of the electric vehicle, the user needs to perform a predetermined operation. The predetermined operation means, as an example, an operation of pressing the power supply switch 11 while depressing a brake pedal. This operation can be performed even if the power supply position is in any one of power off, the second state, and the third state.

Suppose that the user presses the power supply switch 11 while depressing the brake pedal. In the above case, the power supply position changes to a fourth state from power off, the second state, or the third state as shown in FIG. 2. The electric vehicle can travel in the fourth state. Further, in the fourth state, the power supply switch 11 is turned on, and the indicator of the power supply switch 11 is turned on. In the fourth state, the relay 13 is turned on, and power is supplied from the high-power battery 12 to the low-power battery 15 with the relay 13 therebetween. In the fourth state, as in the third state, all electrical components including the meter and the blower motor are operated. In the fourth state, the meter displays an icon showing that the vehicle can travel. If the user presses the power supply switch 11 after travelling of the vehicle is completed, the power supply position changes from the fourth state to the second state as shown in FIG. 2. This is because there is a need for the user to use the audio device and the like even after the travelling of the vehicle is completed. The fourth state may be referred to as READY-ON.

Hereinafter, a state in which power is supplied from the high-power battery 12 to the low-power battery 15 with the relay 13 therebetween may be referred to as a "high-power state". The second, third, and fourth states shown in FIG. 2 are high-power states.

Next, the on/off state of the relay 13 will be described with reference to FIG. 3.

The table shown in FIG. 3 shows how the on/off state of the relay 13 is controlled depending on the power supply position.

As shown in FIG. 3, when the power supply position is power off, the relay 13 is normally turned off. When the power supply position is in the second state, the relay 13 is normally turned on. When the power supply position is in the third state, the relay 13 is normally turned on. When the power supply position is in the fourth state, the relay 13 is normally turned on.

Suppose that the power supply position is in the second state and the power supply switch 11 is pressed for a predetermined time (for example, 2 seconds) or longer. In the above case, the controller 10 switches the relay 13 from the on state to the off state as shown in FIG. 3. More specifically, when the power supply switch 11 is pressed for a predetermined time or longer, the first signal (see FIG. 1) is transmitted from the power supply switch 11 to the controller 10. The controller 10 that has received the first signal switches the relay 13 from the on state to the off state. As a result, the low-power battery 15 is disconnected from the high-power battery 12, and power supply from the high-power battery 12 is stopped. This releases the high-power state.

One of the reasons why the high-power state is released when the power supply switch 11 is pressed for a predetermined time or longer in this way is to cope with an unexpected event. When an unexpected event occurs and rescue is required, a prompt release of the high-power state is required. Therefore, the controller 10 of the present embodiment switches the relay 13 from the on state to the off state upon receiving the first signal. The first signal is transmitted by means of pressing and holding (for example, 2 seconds or longer) of the power supply switch 11. Therefore, according to the present embodiment, the high-power state can be easily and promptly released. The above described predetermined time is not limited to 2 seconds and can be changed appropriately.

Even when the power supply position is in the third state, as in the second state, the controller 10 switches the relay 13 from the on state to the off state when the user presses and holds the power supply switch 11 for a predetermined time or longer.

The first signal is transmitted from the power supply switch 11 only when the power supply position is in the second state or the third state. In other words, when the power supply position is power off or in the fourth state, even if the power supply switch 11 is pressed for a predetermined time or longer, the first signal is not transmitted from the power supply switch 11. Therefore, the state of the relay 13 does not change as shown in FIG. 3 when the power supply position is power off or in the fourth state, even if the power supply switch 11 is pressed for a predetermined time or longer.

In addition to the rescue described above, the release of the high-power state is required for work in a factory, software update work of the controller mainly related to high power, and the like. In such work also, the prompt release of the high-power state is required as in the rescue. According to the present embodiment, the high-power state can be released only by pressing and holding the power supply switch 11. This realizes the easy and prompt release of the high-power state, and the smooth performance of the work in the factory, the software update work of the controller mainly related to high power, and the like. In the present embodiment, even in a state in which the high-power state is released (the second state and the third state), power is supplied from the low-power battery 15 to the electrical components 16.

Next, with reference to FIG. 4, the energization states in the electric vehicle in each power supply position state will be described.

The table in FIG. 4 shows the energization states of the door locks, the communication device, the security device, the dark current, the electrical components 16, and an EV system as energization states in the electric vehicle. The electrical components 16 are classified into the navigation device, the audio device, the meter, the blower motor, a power window, and the DCDC converter 14. Further, the EV system is also classified into a heater, a compressor, and an inverter. The heater is used to heat the high-power battery 12.

From the low-power battery 15, power is supplied to the navigation device, the audio device, the meter, the blower motor, the power window, and the DCDC converter 14. From the high-power battery 12, power is supplied to the heater, the compressor, and the inverter.

As shown in FIG. 4, the power supply position is classified into power off (the first state), the second state, the third state, the fourth state, and a fifth state. Power off, the second state, the third state, and the fourth state have already been described above. Suppose that the power supply switch 11 is pressed and held for a predetermined time or longer when the power supply position is in the second or third state. In the above case, this kind of power supply position changes to the fifth state.

As shown in FIG. 4, when the power supply position is power off, power is supplied from the low-power battery 15 to the door locks (including unlocking), the communication device, and the security device. Meanwhile, power is not supplied to the electrical components 16 from the low-power battery 15. Similarly, power is not supplied to the EV system from the high-power battery 12. However, a minute current (what is referred to as a dark current) flows through the electrical components 16 to back up the functions. In the first to fifth states, the energization states of the door locks, the communication device, the security device, and the dark current are the same, and therefore the description thereof is omitted.

When the power supply position is in the second state, from the low-power battery 15, power is supplied to the navigation device, the audio device, the power window, and the DCDC converter 14 as shown in FIG. 4. Further, when the power supply position is in the second state, since the second state is the high-power state as described above, from the high-power battery 12, power is supplied to the heater, the compressor, and the inverter. When the power supply position is in the second state, power is not supplied to the meter and the blower motor from the low-power battery 15. This is because, as described above, in the second state, a mechanism (what is referred to as a time limit) is set in which under a predetermined condition, the second state automatically changes to power off. As described above, if the air conditioner is automatically turned off, the user may feel dissatisfied. Since the meter is an electrical component for providing various pieces of information to the user, the user may feel an inconvenience if the meter is automatically turned off. Therefore, power is not supplied to the meter and the blower motor from the low-power battery 15 in the second state.

When the power supply position is in the third state, power is supplied to all the devices shown in FIG. 4. Unlike the second state, the third state has no time limit. In other words, even if a predetermined time elapses during which no operation is performed by the user in the third state, the power supply position does not automatically change from the third state to power off.

When the power supply position is in the fourth state, power is supplied to all the devices shown in FIG. 4.

When the power supply position is in the fifth state, the high-power state is released as described above, and therefore no power is supplied from the high-power battery 12 to the heater, the compressor, and the inverter as shown in FIG. 4.

Here, the change from the third state to the fifth state is supplemented. As described above, suppose that the power supply position is in the third state and the power supply switch 11 is pressed and held for a predetermined time or longer. In the above case, the power supply position changes to the fifth state. At this time, when the power supply switch 11 is pressed, the power supply position first changes to the second state. When the power supply switch 11 is continuously pressed and held for a predetermined time or longer, the power supply position changes to the fifth state. As described above, the high-power state can be released by means of the same operation (pressing and holding the power supply switch 11) even if the power supply position is in either the second state or the third state. Therefore, it is possible to prevent the operation from becoming complicated as compared with the case where the operation is differentiated depending on the state of the power supply position.

Next, an operation example of the power supply control device 100 will be described with reference to the timing chart of FIG. 5.

The initial state (time: 0) in FIG. 5 indicates the second state. That is, the timing chart shown in FIG. 5 starts from a scene in which the controller 10 receives the third signal (see FIG. 1) and changes the power supply position from power off to the second state.

Since the power supply position is in the second state in the initial state of FIG. 5, the system request is on. The system request being on means a request for the high-power state. Since the system request is on, the controller 10 turns on the relay 13 and supplies power from the high-power battery 12 to the low-power battery 15 with the relay 13 therebetween.

Here, it is assumed that the power supply switch 11 is pressed and held at time T1 in FIG. 5. Examples of persons who may press and hold the power supply switch 11 are assumed to include the user of the electric vehicle, a rescue member, a worker in a factory, a dealer, and the like. When the power supply switch 11 is pressed and held, a timer (one of the functions of the controller 10) is activated, and the time during which the power supply switch 11 is pressed and held is measured.

When the time during which the power supply switch 11 is pressed and held is a threshold value or longer (time T2), the controller 10 switches the relay 13 from the on state to the off state. As a result, the low-power battery 15 is disconnected from the high-power battery 12, and power supply from the high-power battery 12 is stopped. This releases the high-power state. At time T2, the power supply position changes from the second state to the fifth state. Note that the threshold value used here has the same meaning as the predetermined time described above.

At time T2, the controller 10 switches the relay 13 from the on state to the off state and switches an inhibition flag from 0 to 1. The inhibition flag is a flag used to inhibit the controller 10 switching the relay 13 from the off state to the on state. When the inhibition flag is set to 0, the controller 10 can switch the relay 13 from the off state to the on state. Meanwhile, when the inhibition flag is set to 1, the controller 10 may not switch the relay 13 from the off state to the on state.

Here, the purpose of setting the inhibition flag will be described. As described above, in the present embodiment, in order to promptly release the high-power state, when the power supply switch 11 is pressed and held for a predetermined time or longer, the controller 10 switches the relay 13 from the on state to the off state. After the the relay 13 is switched from the on state to the off state, if the user presses the unlocking switch of the intelligent key 20 again, for example, the controller 10 switches the relay 13 from the off state to the on state again. This changes the state again to the high-power state. Therefore, it is necessary to prevent the state from changing to the high-power state again after the high-power state is released.

Therefore, in the present embodiment, when the power supply switch 11 is pressed and held for a predetermined time or longer, the inhibition flag is switched from 0 to 1. This prevents the state from changing to the high-power state again even if the user presses the unlocking switch of the intelligent key 20 again after the high-power state is released.

As shown in FIG. 6, if the time during which the power supply switch 11 is pressed and held (1.5 seconds) is shorter than the threshold value, the controller 10 does not switch the relay 13 from the on state to the off state. Further, the controller 10 does not switch the inhibition flag from 0 to 1.

Next, another operation example of the power supply control device 100 will be described with reference to the timing chart of FIG. 7.

The initial state (time: 0) in FIG. 7 shows a state after the inhibition flag is switched from 0 to 1. That is, the timing chart shown in FIG. 7 starts from a state after the time T2 in FIG. 5.

In the initial state of FIG. 7, the high-power state is released and the power supply position is in the fifth state. The electrical components 16 operate even when the power supply position is in the fifth state. Therefore, the system request remains on. When another request is on at time T3 in FIG. 7, the controller 10 switches the inhibition flag from 1 to 0 and switches the relay 13 from the off state to the on state. In the above description, it has been explained that when the power supply switch 11 is pressed and held for a predetermined time or longer, the controller 10 releases the high-power state and prevents the state from changing to the high-power state again. Here, suppose that the cause of releasing the high-power state (rescue, work in a factory, software update work, or the like) is solved. In the above case, it is necessary to return the state to the high-power state again depending on the situation. Examples of the above case include the case of charging the high-power battery 12, the case of making the electric vehicle travel, and the like, for example. When the high-power battery 12 is charged, in order to charge the low-power battery 15 at the same time, it is necessary to return to the state to the high-power state. When the electric vehicle is made to travel, it is necessary to return the state to the high-power state in order to prevent the reduction in the SOC of the low-power battery.

Examples of another request at time T3 in FIG. 7 include a request for charging the high-power battery 12, a request for making the electric vehicle travel, and the like. Another request being on means the case where the second signal (see FIG. 1) indicating the start of charging of the high-power battery 12 is transmitted to the controller 10, or means the case where a signal is transmitted to the controller 10, the signal indicating that the user has pressed the power supply switch 11 while depressing the brake pedal. This other request is different from the system request.

Further, this other request may be a request for controlling an air conditioning device mounted in the electric vehicle. In this case, information that another request is on means the case where a signal for controlling the air conditioning device is transmitted to the controller 10. The signal for controlling the air conditioning device may be a signal for controlling the air conditioner (remote control or timer control) by the user operating the smartphone, or a signal for heating or cooling the high-power battery 12.

When another request different from the system request is on in this way, the controller 10 switches the inhibition flag from 1 to 0 and switches the relay 13 from the off state to the on state. Accordingly, even after the high-power state is released and the change from the state to the high-power state again is prevented, the state can be returned to the high-power state again.

In the examples shown in FIGS. 5 to 7, the case where the power supply position is in the second state has been described, but the same applies to the case where the power supply position is in the third state.

Next, an operation example of the power supply control device 100 will be described with reference to the flowchart of FIG. 8.

In step S101, when the user presses the unlocking switch of the intelligent key 20, the third signal is transmitted from the intelligent key 20 to the controller 10 (see FIG. 1). The process proceeds to step S103, and in step S103, the controller 10 that has received the third signal changes the power supply position from power off (the first state) to the second state (see FIG. 2). This enables the user to use the navigation device and the like immediately after getting on the vehicle. In the second state, the relay 13 is turned on, and power is supplied from the high-power battery 12 to the low-power battery 15 with the relay 13 therebetween.

If the power supply switch 11 is pressed and held for a predetermined time or longer (YES in step S105), the process proceeds to step S107, and in step S107, the controller 10 switches the relay 13 from the on state to the off state. This disconnects the low-power battery 15 from the high-power battery 12 and stops power supply from the high-power battery 12. Accordingly, the high-power state is released. Further, the controller 10 switches the inhibition flag from 0 to 1 (step S109). This prevents switching the relay 13 from the off state to the on state, and prevents the state from changing to the high-power state again. If the answer is NO in step S105, the process is in a standby state.

After the process of step S109, suppose that the user connects the external power supply 30 and the electric vehicle by using the dedicated charging cable to start charging the high-power battery 12. In the above case, the second signal indicating the start of charging the high-power battery 12 is transmitted to the controller 10. If the controller 10 receives the second signal (YES in step S111), the process proceeds to step S113, and the controller 10 switches the inhibition flag from 1 to 0. This enables the controller 10 to switch the relay 13 from the off state to the on state. In step S115, the controller 10 switches the relay 13 from the off state to the on state. As described above, according to the present embodiment, it is possible to promptly release the high-power state or to restore the state to the high-power state again depending on the situation.

Figure 8:
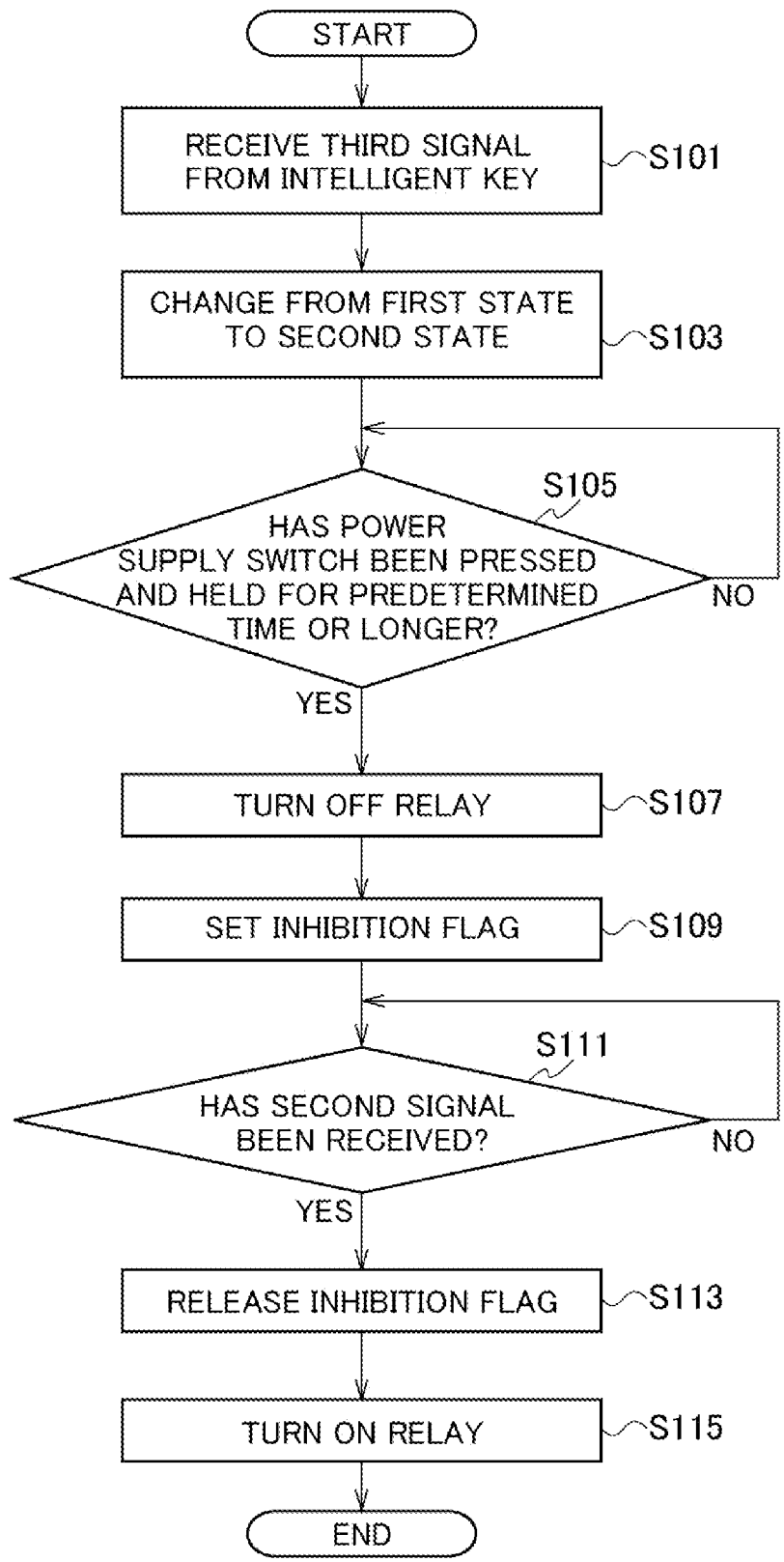
FIG. 8 is a flowchart for explaining an operation example of a power supply control device 100 according to an embodiment of the present invention.

In the example shown in FIG. 8, the case where the power supply position changes to the second state in step S103 has been described. However, the same applies to the case where the power supply position changes to the third state.

Functions and Effects

As described above, in accordance with the power supply control device 100 according to the present embodiment, it is possible to obtain the following functions and effects.

Suppose that the controller 10 receives the first signal (see FIG. 1) when the power supply position is in the second or third state. In the above case, the controller 10 switches the relay 13 from the on state to the off state and then inhibits the relay 13 from switching from the off state to the on state. This prevents the state from changing to the high-power state again even if the user presses the unlocking switch of the intelligent key 20 again after the high-power state is released, for example.

Suppose that the controller 10 receives the second signal (see FIG. 1) after inhibiting the relay 13 from switching from the off state to the on state. In the above case, the controller 10 switches the relay 13 from the off state to the on state. This enables returning of the state to the high-power state again even after the high-power state is released and the change from the state to the high-power state again is prevented.

The second signal includes at least one of a signal for enabling the electric vehicle to travel, a signal indicating the start of charging of the high-power battery 12, the signal for controlling the air conditioning device mounted in the electric vehicle, and a signal for preventing the remaining capacity of the low-power battery 15 from decreasing.

If the controller 10 receives the third signal from the intelligent key 20, the controller 10 changes the power supply position from power off to the second state. In other words, if the controller 10 receives the third signal from the intelligent key 20, the controller 10 changes a state in which a power supply is turned off (a non-high-power state) to a state in which power is supplied from the high-power battery 12 to the low-power battery 15 with the relay 13 therebetween (the high-power state). That is, in the present embodiment, the non-high-power state is easily changed to the high-power state. Therefore, suppose that the controller 10 switches the relay 13 from the on state to the off state due to the user pressing and holding the power supply switch 11. In the above case, the controller 10 sets an inhibition flag such that the relay 13 is not switched from the off state to the on state again even if the controller 10 receives the third signal after performing the switching. This prevents the state from changing to the high-power state again even if the user presses the unlocking switch of the intelligent key 20 again after the high-power state is released, for example.

Each function described in the above embodiment may be implemented by means of one or more processing circuits. The processing circuit includes a programmed processing device such as a processing device including an electrical circuit. The processing circuitry also includes devices such as application specific integrated circuits (ASICs) and circuit components that are arranged to perform the described functions.

As described above, although an embodiment of the present invention has been described, it should not be understood that the arguments and drawings forming part of this disclosure are intended to limit the present invention. Various alternative embodiments, examples, and operational techniques will be apparent to those skilled in the art from this disclosure.

REFERENCE SIGNS LIST

100 Power supply control device
10 Controller
11 Power supply switch
12 High-power battery
13 Relay
14 DCDC converter
15 Low-power battery
16 Electrical component
20 Intelligent key
30 External power supply

The invention claimed is:

1. A power supply control method for a power supply control device including:
   a high-power battery;
   a low-power battery;
   a relay that electrically connects the high-power battery and the low-power battery;
   a power supply switch; and
   a controller that receives at least a door unlock signal for unlocking a vehicle door and a first signal for turning off the relay and controls an on/off state of the relay, the power supply control method comprising:
   when the controller receives the door unlock signal, switching a power supply position which switches a power supply state from a state where the power supply switch is turned off to a state where power is supplied from the high-power battery to the low-power battery with the relay; and
   when the controller receives the first signal, switching the relay from an on state to an off state and then inhibiting the relay from switching from the off state to the on state due to reception of the door unlock signal.

2. The power supply control method according to claim 1, wherein, when the controller receives the first signal and switches the relay from the on state to the off state, power is supplied from the low-power battery to an electrical component mounted in a vehicle.

3. The power supply control method according to claim 1, wherein the first signal is a signal indicating that the power supply switch has been pressed and held for a predetermined time or longer.

4. The power supply control method according to claim 1, wherein if the controller receives a second signal after inhibiting the relay from switching from the off state to the on state, the controller switches the relay from the off state to the on state.

5. The power supply control method according to claim 4, wherein the second signal includes at least one of a signal for enabling a vehicle to travel, a signal indicating a start of charging of the high-power battery, a signal for controlling an air conditioning device mounted in the vehicle, and a signal for preventing a remaining capacity of the low-power battery from decreasing.

6. The power supply control method according to claim 1, wherein
   the power supply state includes a first state in which a power supply is turned off and a second state in which power is supplied from the high-power battery to the low-power battery with the relay therebetween, and
   if the controller receives a third signal transmitted from a key possessed by a user before the user gets on a vehicle, the controller changes the power supply state from the first state to the second state.

7. A power supply control device comprising:
   a high-power battery;
   a low-power battery;
   a relay that electrically connects the high-power battery and the low-power battery;
   a power supply switch; and
   a controller that receives at least a door unlock signal for unlocking a vehicle door and a first signal for turning off the relay and controls an on/off state of the relay, wherein the controller is configured to:
   when the door unlock signal is received, switch a power supply position which switches a power supply state from a state where the power supply switch is turned off to a state where power is supplied from the high-power battery to the low-power battery with the relay; and
   when the first signal is received, switch the relay from an on state to an off state and then inhibits the relay from switching from the off state to the on state due to reception of the door unlock signal.

* * * * *